J. W. BRUNER.
Corn-Planter.

No. 212,787.    Patented Mar. 4, 1879.

WITNESSES:
R. F. Turner
Saml Kennon Jr.

James W Bruner INVENTOR
By Howard Bros
his ATTORNEYS

UNITED STATES PATENT OFFICE.

JAMES W. BRUNER, OF WHEELING, WEST VIRGINIA.

IMPROVEMENT IN CORN-PLANTERS.

Specification forming part of Letters Patent No. 212,787, dated March 4, 1879; application filed June 6, 1878.

*To all whom it may concern:*

Be it known that I, JAMES W. BRUNER, of Wheeling, in the county of Ohio and State of West Virginia, have invented certain new and useful Improvements in Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates specially to a device for planting corn on hilly ground, the operation of the machine being such that the furrow is made, the corn dropped with the requisite number of grains in hills, and the same covered with soil at one operation.

The construction of the seed-dropping mechanism is such that it can be readily attached to almost any kind of a soil-plow.

Figure 1:
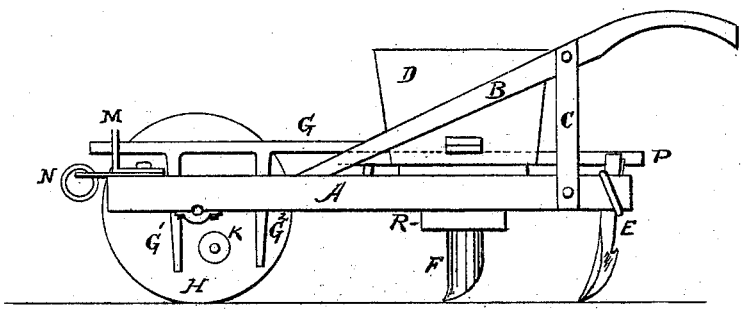
Figure 2:
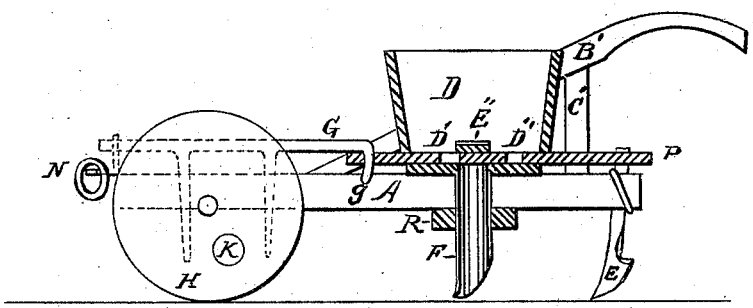
Figure 3:
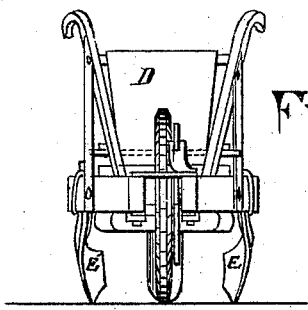
Figure 4:
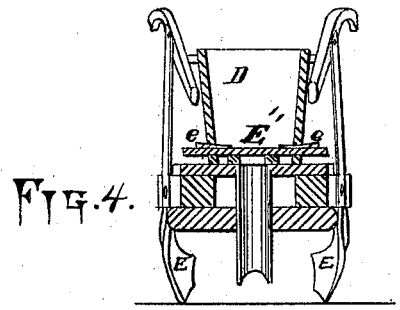

In the drawings, Figure 1 is a side view of the corn-planter; Fig. 2, vertical central section; Fig. 3, front end view; Fig. 4, cross-section.

The letter A represents frame of plow; B B', handles; C C', braces; E E', shovels; D, seed-hopper; P, seed-slide, working through bottom of hopper, and having openings D' D'' for receival of grain; F, seed-spout and furrow-plow; G, draw-bar, secured to seed-slide P by means of the hook end $g$, which is prolonged or made quite long, as shown, and resting on standards M, having arms $G^1$ $G^2$ at right angles. H is a traction-wheel journaled to the frame-work of the plow; K, small wheel or stud pivoted to side of wheel H; R, cross-brace; N, clevis. E'' is an elastic strap or cut-off extending across the bottom of the hopper and through the sides of the same, and secured at each end to prevent slipping and preserve proper degree of tension.

The mode of operation is as follows: The seed-dropping mechanism is operated by the stud K on the wheel H, which impinges with the arms $G^1$ $G^2$ on the bar G, causing the seed-slide P to move backward and forward in the hopper D, which places the openings D' D'' alternately over the seed-spout F, discharging their contents at each successive movement. The elastic strip E'' serves to brush off the surplus grains, and prevents jamming and crushing of the grain as the slide passes to and fro.

The number of grains to be dropped is regulated by the size of the seed-holes D' D'', and the distance apart for the hills is gaged by the stud K on the wheel H in connection with the arms $G^1$ $G^2$ and seed-holes D' D''.

The furrow-plow and seed-spout combined make the furrow for the corn, and the shovels E E' cover the seed as it is dropped from the spout.

The advantages of my seed-dropping device for planting corn in hilly ground, its ready adaptability to corn-coverers already in use, its simplicity in construction, and practical working are sufficiently apparent, and need not specially be referred to.

Having described my invention, what I claim, and desire to secure by Letters Patent, is—

In a seed-planter, in combination with the seed-dropping mechanism, consisting of hopper D, cut-off E', and seed-slide P D' D'', the independent removable draw-bar G, with pendent right-angled arms $G^1$ $G^2$ and prolonged hook end $g$, guide M, and traction-wheel H, with adjustable stud K, as shown and described, for the purposes specified.

In testimony that I claim the foregoing as my own I hereunto affix my signature in presence of two witnesses.

JAMES W. BRUNER.

Witnesses:
R. F. TURNER,
SAML. KENNEN, Jr.